(12) United States Patent
Kim et al.

(10) Patent No.: US 8,169,584 B2
(45) Date of Patent: May 1, 2012

(54) FABRICATING METHOD OF A LIGHTWEIGHT LIQUID CRYSTAL DISPLAY DEVICE UTILIZING AN AUXILIARY SEAL PATTERN

(75) Inventors: Dae-Jeong Kim, Daegugwangyeok-si (KR); Lim-Su Lee, Daegugwangyeok-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/201,261

(22) Filed: Jul. 24, 2002

(65) Prior Publication Data

US 2003/0038914 A1     Feb. 27, 2003

(30) Foreign Application Priority Data

Jul. 25, 2001   (KR) ............................. 2001-0044927

(51) Int. Cl.
   *G02F 1/1339*   (2006.01)
(52) U.S. Cl. ....................................... 349/154
(58) Field of Classification Search .................. 349/153, 349/154, 189, 190, 73, 74
   See application file for complete search history.

(56) References Cited

U.S. PATENT DOCUMENTS

| | | | | |
|---|---|---|---|---|
| 5,184,239 A | * | 2/1993 | Sano et al. | 349/154 |
| 6,239,855 B1 | * | 5/2001 | Nakahara et al. | 349/153 |
| 6,473,148 B1 | * | 10/2002 | Suh | 349/153 |

FOREIGN PATENT DOCUMENTS

| | | | | |
|---|---|---|---|---|
| JP | 62118324 A | * | 5/1987 | |
| JP | 04-116619 A | * | 4/1992 | |
| KR | 10-1999-0065040 | | 7/2001 | |
| KR | 10-2001-0065171 | | 7/2001 | |

OTHER PUBLICATIONS

Palm Labs Inc., "Cyanoacrylate technical data", www.Palmlabsadhesives.com, Jan. 5, 1998.*

* cited by examiner

*Primary Examiner* — Timothy L Rude

(74) *Attorney, Agent, or Firm* — McKenna Long & Aldridge LLP

(57) ABSTRACT

A method of fabricating a liquid crystal display device includes: providing first and second substrates having a plurality of unit cell regions; forming a plurality of main seal patterns on the first substrate, each main seal pattern having an injection; forming an auxiliary seal pattern on the first substrate, the auxiliary seal pattern surrounding the plurality of main seal patterns and having at least one open portion; attaching the first substrate to the second substrate; providing an adhesive at the at least one open portion; and etching the first and second substrates, wherein a viscosity of the adhesive is within a range of about 5 to 100 centipoises (cP).

6 Claims, 5 Drawing Sheets

FABRICATING METHOD OF A LIGHTWEIGHT LIQUID CRYSTAL DISPLAY DEVICE UTILIZING AN AUXILIARY SEAL PATTERN

This application claims the benefit of Korean Patent Application No. 2001-44927, filed on Jul. 25, 2001, which is hereby incorporated by reference for all purposes as if fully set forth herein.

BACKGROUND OF THE INVENTION

1. Field of the Invention

The present invention relates to a fabricating method of a liquid crystal display (LCD) device, and more particularly to an etching process of a substrate for reducing weight of an LCD device.

2. Discussion of the Related Art

Flat panel display (FPD) devices having small size, lightweight, and low power consumption have been a subject of recent research in the coming of the information age. Among many kinds of FPD devices, LCD devices have been widely developed and used because of their excellent characteristics of resolution, color display and display quality.

Generally, LCD devices include an upper substrate and a lower substrate facing each other with liquid crystal molecules interposed therebetween. Each substrate has an electrode on an inner surface thereof. An electric field is generated by applying a voltage to the electrodes, thereby driving the liquid crystal molecules to display images depending on light transmittance.

The LCD device is fabricated by the processes of forming a lower substrate, referred to as an array substrate, having thin film transistors (TFTs) and pixel electrodes; forming an upper substrate, referred to as a color filter substrate, having common electrodes and color filters; forming a liquid crystal cell by aligning and attaching the substrates; injecting the liquid crystal between the substrates; and sealing and attaching a polarization film. In a conventional LCD device, since a plurality of liquid crystal cells are simultaneously formed on a wide area substrate, a process for cutting the substrate into the unit liquid crystal cells is needed after an assembly process.

FIG. 1 is a flow chart illustrating a fabricating process of a conventional liquid crystal cell.

At step ST1, the lower and upper substrates that include TFTs and color filters, respectively, are formed. The lower substrate is formed by repeating deposition and patterning steps of a thin film and several masks. Recently, a fabrication process that reduces cost by decreasing the number of masks has been investigated. The upper substrate is formed by subsequently making a black matrix, red (R)/green (G)/blue (B) color filters and a common electrode. The black matrix distinguishes the color filters and prevents light leakage of a non-pixel area. The color filter can be formed by a dyeing method, a printing method, a pigment dispersion method or an electro-deposition method; the pigment dispersion method is most widely employed.

At step ST2, an orientation film that determines an initial orientation of the liquid crystal layer is formed on the upper and lower substrates. This step includes deposition and alignment of a polymeric thin film along a specific direction. An organic material of the polyimide series is mainly used as the orientation film and a rubbing method is mainly used as the aligning method of the orientation film. The rubbing method consists of rubbing the orientation film along the specific direction with a rubbing cloth, and has advantages such as easy orientation treatment, suitability to mass production, high stability of the orientation and easy controllability of a pre-tilt angle.

At step ST3, a seal pattern that forms a gap for liquid crystal material injection and prevents leakage of the liquid crystal material is formed on one substrate. The seal patterning process involves forming a desired pattern by application of a thermosetting plastic. A screen print method using a screen mask and a seal dispenser method using a dispenser are used for the seal patterning process. For the simplicity of fabrication, the screen print method has mainly been used. However, since the screen mask is not suitable for a wide substrate and a contamination by contact between the mask and the orientation film often occurs, use of the seal dispenser method has gradually increased.

At step ST4, a spacer having a specific size to maintain a precise and uniform gap between the upper and lower substrates is sprayed onto one of the upper and lower substrates. The spacer spray method can be divided into two different types: a wet spray method that involves spraying a mixture of alcohol and spacer material, and a dry spray method that involves spraying spacer material alone. Furthermore, the dry spray method can be subdivided into two different types: an electrostatic spray method that uses electrostatic force and a non-electric spray method that uses gas pressure. Since the liquid crystal cell structure is susceptible to damage from static electricity, the non-electric method is mainly used.

At step ST5, the upper and lower substrates are attached by pressurized hardening of the seal pattern.

At step ST6, the attached substrates are divided into unit cells. A cell cutting process includes a scribe process that forms cutting lines on a surface of the substrate using a diamond pen, a hardness of which is higher than that of the glass substrate, and a break process that divides the attached substrates into the unit cells by force.

At step ST7, a liquid crystal material is injected into the unit cell. A vacuum injection method using pressure difference between the inside and outside of the unit cells is commonly used as an effective injection method. Since fine air bubbles included in the liquid crystal material can deteriorate the display property of the unit cell, a bubble-eliminating process, in which the unit cells are kept in a vacuum state for a long period of time, is required.

After finishing the liquid crystal material injection, an injection hole is sealed to prevent leakage of the liquid crystal material. Generally, a ultra violet (UV) curable resin is deposited into the injection hole by use of a dispenser and then ultra violet light is irradiated on the resin, thereby hardening the resin and sealing the injection hole. Polarization films are attached on outer surfaces of the unit cell and a driving circuit is connected to the unit cell using an attachment process. After the attachment process, a substrate etching process, in which the outer surfaces of the upper and lower substrates are etched to reduce the thickness of the substrates, is performed according to the desired lightening of the substrate.

FIG. 2 is a flow chart illustrating a substrate etching process.

At step ST11, impurities made during the previous processes are eliminated. If there are impurities on the outer surfaces of the attached substrates, etching quality is deteriorated, such as an under-etching in the vicinity of the impurities occurs and the surfaces of the substrates become rough. Accordingly, since a diffused reflection or a refraction of the light can occur, the impurities are eliminated with a cleaning solution such as isopropyl alcohol (IPA) or deionized water (DI).

At step ST12, the attached substrates are etched. Generally, a glass substrate is used for the liquid crystal substrate and about 60% of the substrate comprises silicon dioxide ($SiO_2$). Therefore, the substrate can be etched with a solution of hydrofluoric (HF) acid which is an etching solution for $SiO_2$.

At step ST13 and ST14, a residue of the HF solution is removed and the substrates are dried.

After etching outer surfaces of the attached substrates, a cutting process ST6 (of FIG. 1) and a liquid crystal injection process ST7 (of FIG. 1) are performed.

However, a seal pattern can be damaged during the substrate etching process. Recently, a forming method of a dual seal pattern is suggested to prevent a damage of a seal pattern resulting from an etching solution permeating through two substrates during the substrate etching process. In the forming method of a dual seal pattern, unit cells are formed on a substrate. Main seal patterns are formed at corresponding unit cells and an auxiliary seal pattern surrounding the main seal patterns is formed between a boundary of the substrate and main seal patterns. Each main seal pattern has an injection hole to inject liquid crystal material. The auxiliary seal pattern prevents a damage of the main seal patterns resulting from an etching solution of a substrate etching process. However, since the auxiliary seal pattern has an open portion to exhaust airs between the attached substrates, the etching solution can permeate into an interior of the unit cells through the open portion. Accordingly, corrosion of a pad of an electrode or breaking of the substrate can occur.

SUMMARY OF THE INVENTION

Accordingly, the present invention is directed to a liquid crystal display device that substantially obviates one or more of problems due to limitations and disadvantages of the related art.

An advantage of the present invention is to provide a fabricating method of a liquid crystal display device, where the weight of a liquid crystal display device is lightened due to a substrate etching while a seal pattern is protected from an etching solution.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device includes: providing first and second substrates having a plurality of unit cell regions; forming a plurality of main seal patterns on the first substrate, each main seal pattern having an injection hole; forming an auxiliary seal pattern on the first substrate, the auxiliary seal pattern surrounding the plurality of main seal patterns and having at least one open portion; attaching the first substrate to the second substrate; providing an adhesive at the at least one open portion; and etching the first and second substrates having the adhesive, wherein a viscosity of the adhesive is within a range of about 5 to 100 centi-poises (cP).

Preferably, the viscosity of the adhesive is within a range of about 40 to 45 cP and the adhesive has a material of cyanoacrylate group. Moreover, the first and second substrates are etched through dipping the first and second substrates into a bath including an etching solution and the etching solution has hydrofluoric acid (HF).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 3:
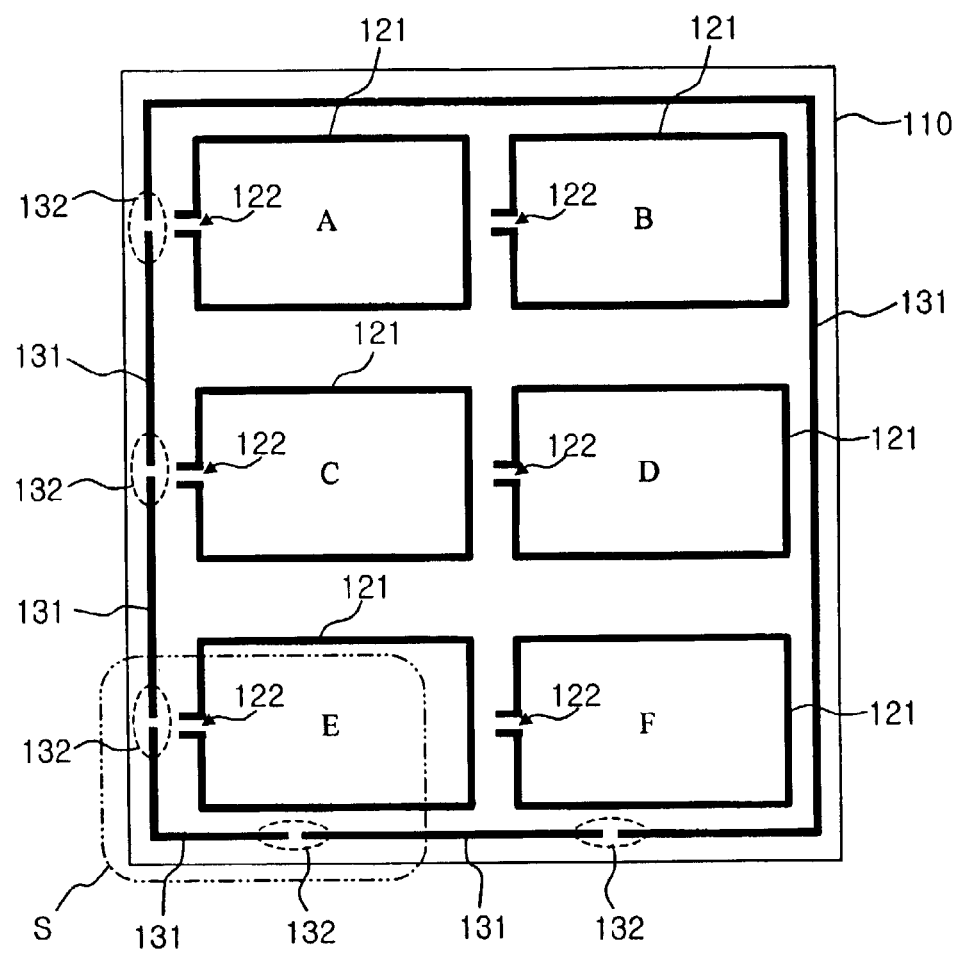
FIG. 3 is a schematic plan view showing seal patterns according to an exemplary embodiment of the present invention.

FIG. 3 is a schematic plan view showing seal patterns according to an exemplary embodiment of the present invention. A first substrate having a size of 590 mm by 670 mm (590×670) has six unit cell regions for a unit cell having a diagonal size of 13.3 inch.

In FIG. 3, six unit cell regions "A, B, C, D, E and F" are defined on a first substrate 110. A main seal pattern 121 is formed at a boundary of each unit cell region. The main seal pattern 121 has an injection hole 122 to inject a liquid crystal material at a left-center portion of each unit cell in a subsequent process. An auxiliary seal pattern 131 is formed between an edge or boundary of the first substrate 110 and the main seal pattern 121. The auxiliary seal pattern 131 surrounding all the main seal patterns 121 prevents damage to the main seal pattern 121 resulting from an etching solution. Further, the auxiliary seal pattern 131 has at least one open portion 132 to exhaust airs between the attached substrates.

After the first substrate 110 having the main and auxiliary seal patterns 121 and 131 is attached to a second substrate (not shown), an adhesive is formed at the at least one open portion 132 of the auxiliary seal pattern 131. Next, about twenty attached first and second substrates are loaded into an etching apparatus and etched by dipping into a bath. Here, the etching apparatus is shown in FIG. 4.

Figure 4:
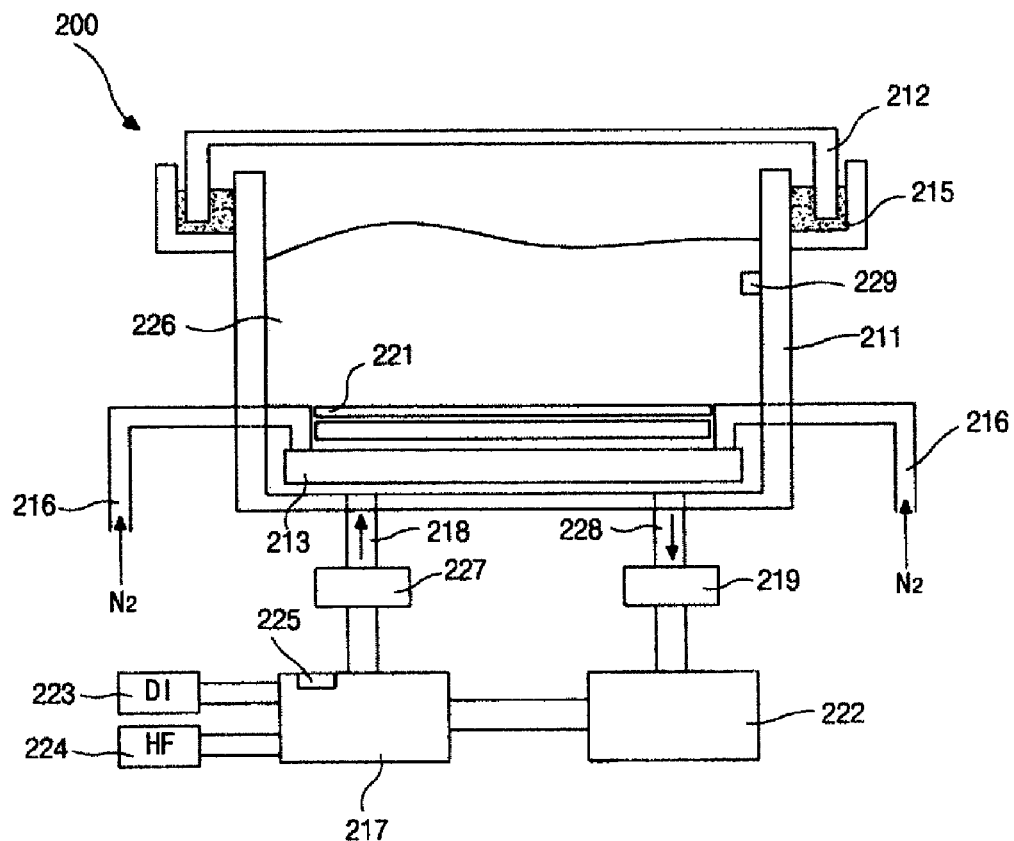
FIG. 4 is a schematic cross-sectional view of an etching apparatus for attached substrates according to an exemplary embodiment of the present invention.

FIG. 4 is a schematic cross-sectional view of an etching apparatus for attached substrates according to an exemplary embodiment of the present invention.

In FIG. 4, an etching apparatus 200 is composed of a bath 211, a cover 212 covering the bath 211 and a bubble plate 213 disposed in the bath 211. The bath 211 and the cover 212 are sealed with a water sealant 215. Air-supplying lines 216, through which nitrogen ($N_2$) or oxygen ($O_2$) are supplied from a gas tank (not shown), are connected to the right and left sides of the bubble plate 213. An etching solution-supplying line 218, through which the etching solution 226 is supplied from a mixture tank 217, is connected to the bottom of the bath 211. The etching solution 226 used for the etching process of the glass substrate 221 is vented to a filter 219 through an etching solution-venting line 228 and then stored in a buffer tank 222 after eliminating impurities by the filter 219. The filtered etching solution stored in the buffer tank 222 is supplied to the mixture tank 217, and mixed with deionized (DI) water and hydrofluoric acid (HF), which are supplied from DI-supplying part 223 and HF-supplying part 224, respectively. Concentration-measuring equipment 225 installed in the mixture tank 217 measures the concentration of the mixed solution. If the concentration reaches the predetermined standard concentration, the supplies of DI and HF are stopped. The standard concentration has a range of about 1~50%. Furthermore, to keep the mixed etching solution at a constant temperature, a pressured cooling water (PCW) line (not shown) is installed in the compound mixture tank 217. The etching solution mixed in the compound mixture tank 217 is supplied to the interior of the bath 211 by a pump 227.

To measure a temperature change resulting from exothermic reaction between the substrate and the etching solution, a temperature-measuring equipment 229 is installed in the bath 211 and the substrate may be etched according to the temperature change, for example, a thickness of about 1.4 mm of the substrate can become about 0.5 mm by this etching process. The temperature is determined by the following equation and the etching process is terminated in case of reaching a final temperature.

$$T_f = T_i + (K_r \cdot N \cdot \Delta t_2)/m,$$

($T_f$: final temperature, $T_i$: initial temperature, $K_r$: reaction constant, N: number of substrates, $\Delta t_2$: desired thickness for etching, m: concentration of etching solution)

In the exemplary embodiment of the present invention, since the attached substrates are etched after bonding the open portion of the auxiliary seal pattern with the adhesive, the etching solution cannot permeate into the interior of the auxiliary seal pattern. Accordingly, the production yield is improved.

Here, the adhesive is made of an acid-resistant substance, for example, a material of cyanoacrylate group whose viscosity is within a range of about 5 to 100 centi-poise (cP). The cP is a unit of viscosity. 1 cP is $10^{-2}$ poise (P) and 1 P means a state that a flux of 1 gram (g) moves 1 centimeter (cm) for 1 second (sec.). If the viscosity of the adhesive is low, the adhesive permeates near the main seal pattern 121 (of FIG. 3). Accordingly, the adhesive is not fully hardened and the etching solution may permeate into the interior of the auxiliary seal pattern 131 (of FIG. 3). The case of using an adhesive of low viscosity, for example, about 5 to 10 cP, is shown in FIG. 5.

Figure 5:
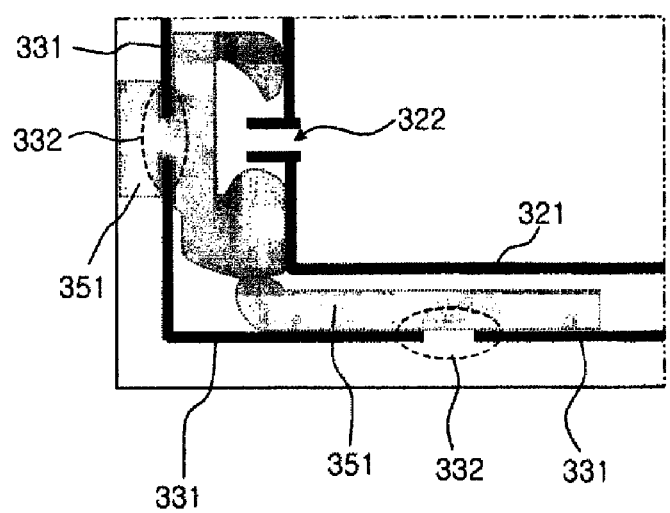
FIG. 5 is a schematic plan view showing an adhesive of low viscosity formed at an open portion of an auxiliary seal pattern.

FIG. 5 is a schematic plan view showing a adhesive of low viscosity formed at an open portion of an auxiliary seal pattern. FIG. 5 corresponds to a region "S" of FIG. 3.

Figure 1:
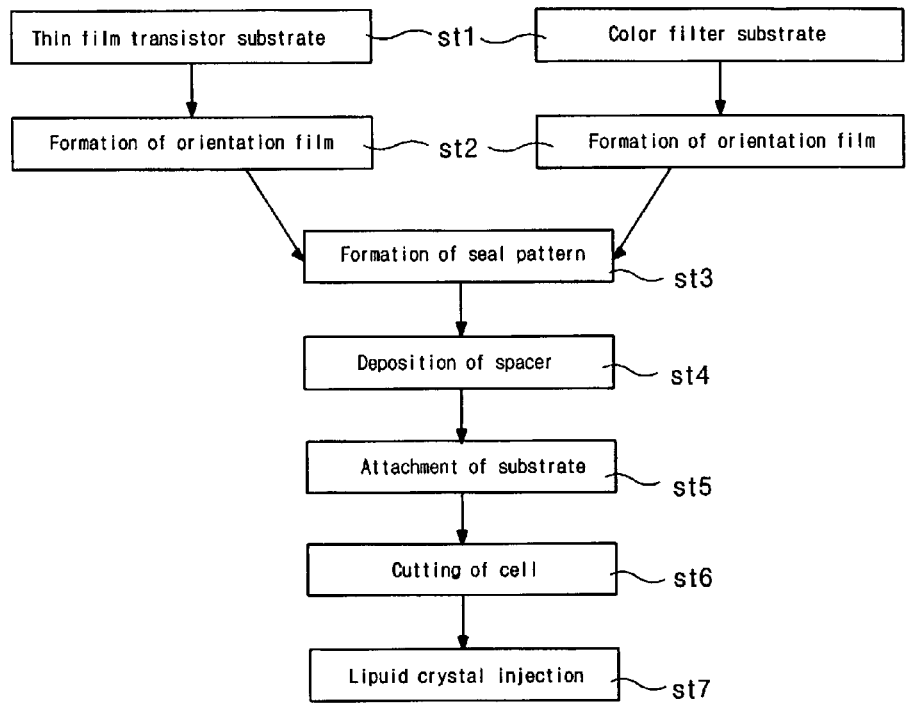
FIG. 1 is a flow chart illustrating a fabricating process of a conventional liquid crystal cell.
Figure 2:
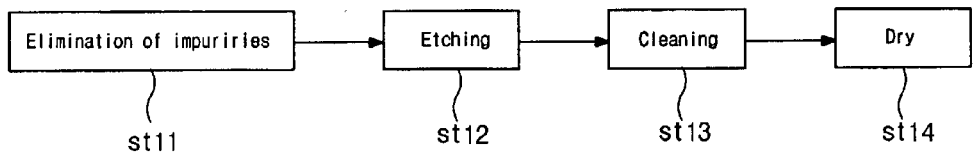
FIG. 2 is a flow chart illustrating a substrate etching process.
Figure 6:
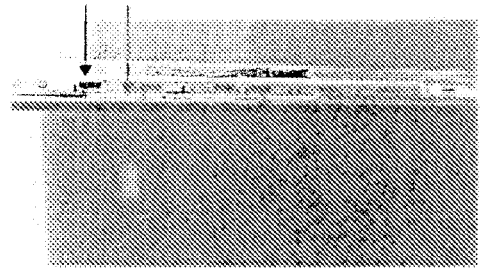
FIG. 6 is a view showing a result of using an adhesive of low viscosity.

In FIG. 5, adhesives 351 are formed at open portions 332 of an auxiliary seal pattern 331 surrounding a main seal pattern 321. Since the adhesives 351 of low viscosity moves freely, the adhesives 351 may permeate to the main seal pattern 321 having an injection hole 322. Accordingly, unit cells may not be divided well in the cell cutting process ST6 (of FIG. 1). Moreover, an etching solution may permeate through the adhesives 351 due to an incomplete hardness of the adhesives 351 during the substrate etching process. The permeation of the etching solution is shown in FIG. 6.

If the adhesive has a viscosity of about 100 cP, the adhesive hardly moves in a bonding portion. Accordingly, an additional bonding process is necessary and a throughput is reduced. Therefore, it is preferable to use an adhesive whose viscosity is within a range of about 40 to 45 cP.

Figure 7:
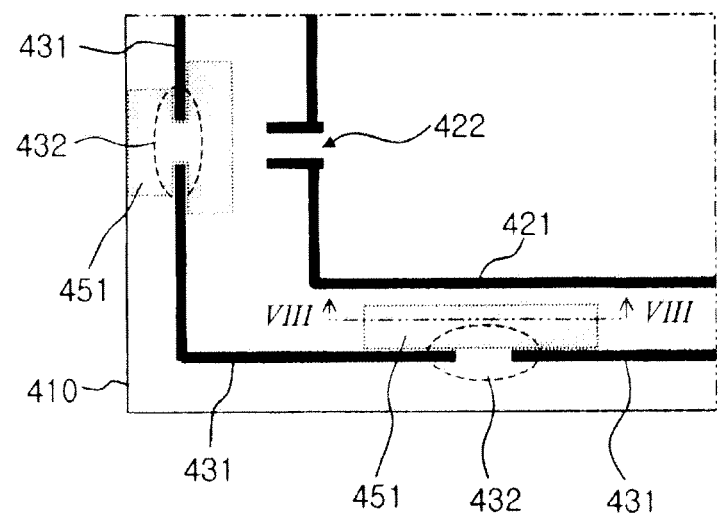
FIG. 7 is a schematic plan view showing an adhesive of preferable viscosity formed at an open portion of an auxiliary seal pattern.

FIG. 7 is a schematic plan view showing an adhesive of preferable viscosity formed at an open portion of an auxiliary seal pattern. FIG. 7 corresponds to a region "S" of FIG. 3.

In FIG. 7, a main seal pattern 421 having an injection hole 422 is formed on a substrate 410 and an auxiliary seal pattern 431 having open portions 432 surround the main seal pattern 421. The open portions 432 for exhausting airs are bonded with adhesives 451. The substrate 410 including the main and auxiliary seal patterns 421 and 431 is attached to another substrate (not shown). Since a viscosity of the adhesives 451 is within a range of about 40 to 45 cP, the adhesives 451 uniformly diffuse to form a specific bonding portion at the open portions 432.

Figure 8:
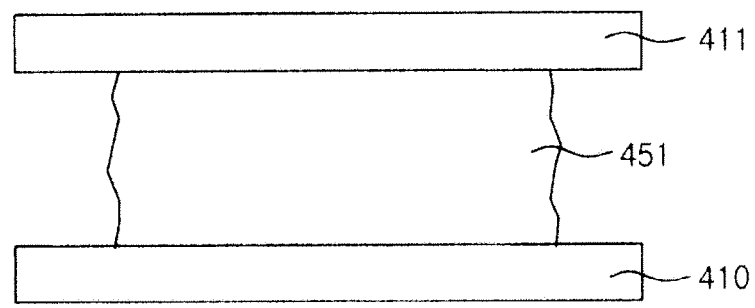
FIG. 8 is a schematic cross-sectional view taken along the line VIII-VIII of FIG. 7.

FIG. 8 is a schematic cross-sectional view taken along the line VIII-VIII of FIG 7.

In FIG. 8, adhesives 451 are formed between first and second substrates 410 and 411 without gaps or vacancy. As a result, an etching solution cannot permeate through the adhesive into an interior of an auxiliary seal pattern.

Figure 9:
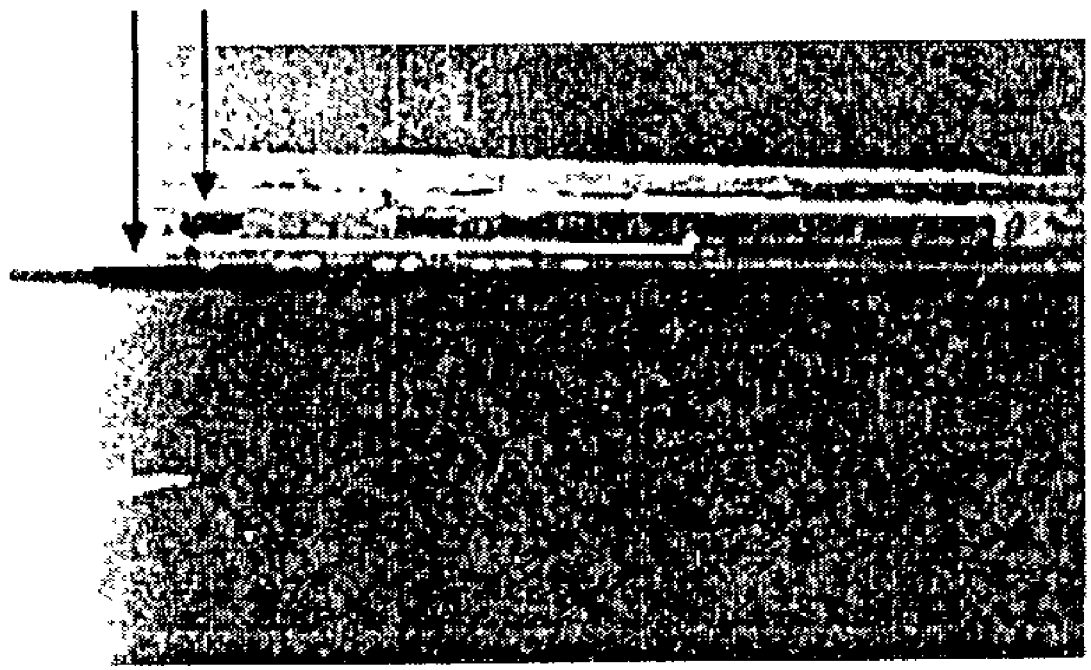
FIG. 9 is a view showing a result of using an adhesive whose viscosity is within a range of 40 to 45 cP.

FIG. 9 is a view showing a result of using an adhesive whose viscosity is within a range of 40 to 45 cP.

As shown in FIG. 9, when attached substrates are etched after bonding an open portion of an auxiliary seal pattern by using an adhesive whose viscosity is within a range of 40 to 45 cP, an etching solution cannot permeate through the adhesive into an interior of the auxiliary seal pattern. Therefore, damages to a main seal pattern or a pad of a unit cell are prevented. Additionally, since the adhesive is uniformly formed at a bonding portion, inferiorities may not occur during a following cell cutting process.

Consequently, after forming a main seal pattern and an auxiliary seal pattern having an open portion, two substrates are attached. Then, the attached substrates are etched to lighten the weight of an LCD device. When the attached substrates are etched, a permeation of an etching solution into a unit cell region is prevented by bonding the open portion of the auxiliary seal pattern with an adhesive. Therefore, damages to the unit cell region are prevented.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   providing first and second substrates having a plurality of unit cell regions;
   forming a plurality of main seal patterns on the first substrate, each main seal pattern having an injection hole;
   forming an auxiliary seal pattern on the first substrate, the auxiliary seal pattern surrounding the plurality of main seal patterns and having at least one open portion two open portions;
   attaching the first substrate to the second substrate;
   forming an adhesive at the at least two open portions of the auxiliary seal pattern and between at least one of the plurality of main seals and the auxiliary seal pattern, wherein the entire adhesive is formed in an area inside an at least one of the two open portions of the auxiliary seal pattern with no adhesive located outside the auxiliary seal pattern and spaced apart from and not touching the at least one of the plurality of main seals and is in contact with a portion of an inner wall of the auxiliary seal pattern on both sides of the at least one open portion, and wherein the adhesive is formed between the first and second substrates without vacancy to completely seal the at least two open portions;
   uniformly etching outer surfaces of the first and second substrates having the adhesive to uniformly reduce a thickness of the first and second substrate; and
   cutting the attached substrates into a plurality of unit cells after etching the attached substrates,
   wherein a viscosity of the adhesive is within a range of about 40 to about 45 centi-poises (cP), and the adhesive protects the unit cells during the etching.

2. The method according to claim 1, wherein the adhesive includes a material of cyanoacrylate group.

3. The method according to claim 1, wherein etching the first and second substrates includes dipping the first and second substrates into a bath having an etching solution.

4. The method according to claim 3, wherein the etching solution includes hydrofluoric acid (HF).

5. The method according to claim 1, further comprising injecting liquid crystal into each of the unit cells.

6. The method according to claim 1, wherein each of the main seal patterns corresponds to the unit cell.

* * * * *